United States Patent
Schindler et al.

(10) Patent No.: US 7,032,480 B2
(45) Date of Patent: Apr. 25, 2006

(54) DEVICE AND METHOD FOR CONFIGURING A SCREW SYSTEM

(75) Inventors: Albrecht Schindler, Aspach (DE); Thorsten Klepsch, Aspach (DE); Alwin Belschner, Michelbach (DE); Heinz Veitinger, Murrhardt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/250,887

(22) PCT Filed: Jan. 11, 2002

(86) PCT No.: PCT/DE02/00073

§ 371 (c)(1),
(2), (4) Date: Oct. 23, 2003

(87) PCT Pub. No.: WO02/055269

PCT Pub. Date: Jul. 18, 2002

(65) Prior Publication Data

US 2004/0068382 A1 Apr. 8, 2004

(30) Foreign Application Priority Data

Jan. 11, 2001 (DE) ................................ 101 00 887

(51) Int. Cl.
*B25B 23/00* (2006.01)

(52) U.S. Cl. ...................................................... 81/429
(58) Field of Classification Search .................. 81/429, 81/434, 433, 57.37; 227/120, 136
See application file for complete search history.

(56) References Cited

U.S. PATENT DOCUMENTS 5,170,851 A 12/1992 Binder
5,890,405 A 4/1999 Becker

FOREIGN PATENT DOCUMENTS

DE 36 45 027 A 12/1988
EP 0 285 815 A1 10/1988

*Primary Examiner*—Lee D. Wilson
(74) *Attorney, Agent, or Firm*—Michael J. Striker

(57) ABSTRACT

The aim of the invention is to accomplish a new configuration or a reconfiguration of a screw system. To this end, a control unit (12) detects the actual components, which are installed in a screw system, as well as their characteristics, and said control unit (12) subsequently determines differences between the actual components and specified components that, for a specified configuration, were selected from a database (15), in which all available components are stored with their specific characteristics. Finally, actual and specified components that differ from one another are displayed on a display (16).

6 Claims, 1 Drawing Sheet

DEVICE AND METHOD FOR CONFIGURING A SCREW SYSTEM

BACKGROUND OF THE INVENTION

The present invention concerns a device and a method for configuring a screw system that comprises at least one screwdriver composed of a plurality of components, and a control unit with which the functional parameters—preferably rotational speed, torque, angle of rotation, direction of rotation—of the screwdriver can be controlled.

Electrically-controlled screw systems are used in assembly-intensive production areas. Screw systems of this type are typically composed of one or more electrically-controlled screwdrivers. Each of said screwdrivers is composed of a multitude of components, usually a power supply unit, a drive motor, a screw spindle, a gearbox, one or more measured-value transmitters, a driven unit, one or more interface modules, etc. A control unit is also provided that controls and monitors the screwing process. The components listed hereinabove that are combined to form one unit are also referred to as a screw passage, whereby a plurality of screw passages of this type can also form a complex screw system. A screwdriver and a screwing method for automatically fastening screws and/or nuts is described in EP 0 285 815 A1, for example.

A screw system of the type mentioned hereinabove should be capable of handling different screwing processes. To accomplish this, the screw system and/or the individual screwdrivers belonging thereto must be configured such that they are adapted for the screwing process to be carried out. "Configuration" means that the individual components belonging to a screwdriver are selected according to their type and specific characteristics such that they are adapted for the screwing process to be carried out. The invention is therefore based on the object of providing a device and/or a method of the type mentioned initially, with which a screwing system can be configured with the least possible effort for the screwing process to be carried out.

SUMMARY OF THE INVENTION

The stated object is attained with a device and a method for configuring a screw system. According to the present invention, a database is available in which all available components are stored with their specific characteristics. In addition, there is an operating unit with which the specified components of one or more screwdrivers intended for a specified configuration can be selected from the database. A control unit for the at least one screwdriver comprises means that detect the installed actual components and determine differences between specified components and corresponding actual components. Finally, the actual and specified components that differ from one another are displayed on a display. The display on the display enables the user who is configuring the screwing system to quickly understand which components of the screwdriver or screwdrivers must be changed and replaced with new components that fulfill the specified configuration. The user therefore receives specific information about the new screwdriver components to be configured, whereby the database provides him with a quick overview of all compatible component types that are available.

Since the components called up from the database can be displayed with their characteristics on the display, the user obtains comprehensive information about the components available for a new configuration or a reconfiguration of a screw system.

Advantageously, the actual components with their characteristics detected by the control unit and the specified components with their characteristics entered in the control unit can be displayed next to one another in separate fields on the display, and the specified and actual components that differ from one another are optically highlighted relative to other specified and actual components.

Each screwdriver can comprise a plurality of the following components, for example: drive motor, gearbox, driven unit, screw spindle, power supply unit, measured-value transmitter, control, interface module. A memory element is advantageously associated with each of the individual components, in which a type identifier and/or characteristics are stored. The control unit has access to the memory elements of the components and can therefore determine the actual configuration of the individual screwdrivers in a very fast, simple manner and inform the user about this on a display.

BRIEF DESCRIPTION OF THE DRAWINGS

The invention shall be described in greater detail hereinbelow with reference to an exemplary embodiment shown in the drawings.

DETAILED DESCRIPTION OF THE PREFERRED EMBODIMENTS

Figure 1:
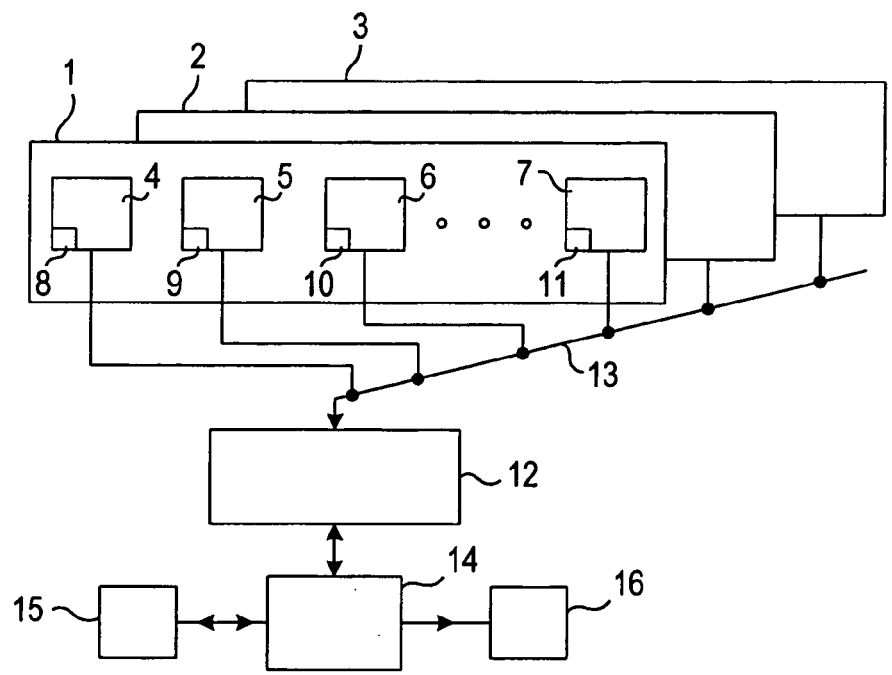
FIG. 1 is a basic block diagram of a screw system.

A screw system composed of a plurality of screwdrivers 1, 2 and 3 is shown purely schematically in FIG. 1 in the form of a block diagram. A screw system can comprise a plurality of individual screwdrivers or just one screwdriver. As illustrated with reference to screwdriver 1 in FIG. 1, every screwdriver comprises a plurality of components 4, 5, 6, 7. The components of a screwdriver typically include a control, a driver motor, a power supply unit, a gearbox, a driven unit, a screw spindle, a measured-value transmitter that detects the rotational speed and/or the torque and/or the angle of rotation of the screw spindle, for example. If a plurality of screwdrivers with their components is connected to a bus system that is connected to a common control unit, every screwdriver still has one or more bus interface modules. The individual screwdrivers can also comprise further suitable components that are not mentioned here.

Memory elements 8, 9, 10, 11 are associated with individual screwdriver components 4, 5, 6, 7, in which said memory elements a type identifier of the respective component and, possibly, characteristics of the components are stored. The type identifier indicates which type of component it is or which special type of this component it is. In the case of a drive motor, the characteristics stored in the associated memory element can be the maximum rotational speed and the maximum torque, for example; in the case of a gearbox, they can be the efficiency and gear ratio.

A control unit 12 has access to the memory elements 8, 9, 10, 11 of the component 4, 5, 6, 7 via a bus line 13 to which all screwdrivers 1, 2, 3 with their components 4, 5, 6, 7 are connected. The control unit 12 can therefore determine the actual configuration of each screwdriver 1, 2, 3, i.e., it can determine which components 4, 5, 6, 7 currently make up each screwdriver 1, 2, 3. In addition, the task of the control unit 12 is to monitor and control the screwing process.

Variables to be controlled include the rotational speed, the torque, and the angle of rotation of the screw spindle. In deviation from the exemplary embodiment shown, the individual components 4, 5, 6, 7 of the screwdriver 1, 2, 3 can also be connected in parallel with the one or more control units 12 without a bus line 13.

An operating unit 14 is available, with which data concerning the configuration of the screw system can be entered into or called up from the control unit 12. In addition, the operating unit 14 is connected with a database 15 in which all available screwdriver components with their specific characteristics are stored. The data called up from the database 15 or the control unit 12 via the operating unit 14, i.e., screwdriver components with their type identifiers and specific characteristics, can be displayed on a display 16 connected to the operating unit 14. The user who is charged with configuring a screw system is therefore able to obtain a quick overview of the available screwdriver components stored in the database 15 and to obtain quick information about the actual components currently installed in the screw system.

Figure 2:
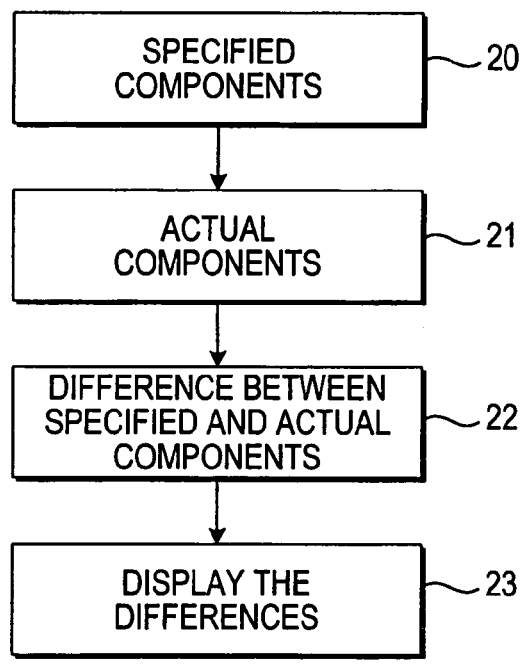
FIG. 2 is a flow chart for the configuration of the screw system.

FIG. 2 shows a flow chart of a method that takes place when a screw system is newly configured or reconfigured. In a first step 20, the specified components required for a specified configuration of the screw system are selected from the database 15. In step 21, the control unit 12 determines the actual components of the currently configured screw system. After the control unit 12 knows the specified components for a specified configuration and the actual components for the current configuration, it determines differences between specified components and actual components in step 22. Possible differences are that, instead of an actual component of a certain type, a comparable specified component of another type should be used, or that an actual component is not recognized by the control unit because it was either assigned incorrectly or it is defective. Differences between specified and actual components are optically highlighted on the display 16 in order to provide the user with a quick overview. The information about specified and actual components is particularly easy to understand when the actual components and the specified components with their characteristics are displayed in separate fields next to one another on the display. Differences between specified and actual components can then be made clearly visible on the display by highlighting them with a colored background, for example. With this information, the user can then newly install components in the screw system or make repairs.

What is claimed is:

1. A configurable screw system, comprising at least one screwdriver composed of a plurality of components having characteristics selected from the group consisting of rotational speed, torque, angle of rotation and direction of rotation; a database in which said components are stored with said characteristics; an operating unit for selecting from said database said components provided for a specific configuration; a control unit for detecting installed components and determining differences between specified components and actual components; and means for displaying the specified components and the actual components that differ from one another on a display unit.

2. A configurable screw system as defined in claim 1, wherein said display unit is formed so that said components called up from said database are displayed on said display unit with said characteristics.

3. A configurable screw system as defined in claim 1, wherein said display unit is formed so that said actual components with said characteristics detected by said control unit and said specified components with their characteristics entered in said control unit are displayed next to one another in separate fields in said display unit, and those specified and actual components that differ from one another are optically highlighted relative to other specified and actual components.

4. A configurable screw system as defined in claim 1, wherein said components of said at least one screwdriver are selected from the group consisting of a drive motor; a gear box, a driven unit, a screw spindle, a power supply unit, a measured-value transmitter and at least one interface module.

5. A configurable screw system as defined in claim 1; and further comprising memory elements associated with individual ones of said components, in which type identifiers and/or characteristics are stored, said control unit having access to said memory elements associated with said components.

6. A method for configuring a screw system, comprising the steps of providing at least one screwdriver composed of a plurality of components having characteristics selected from the group consisting of rotational speed, torque, angle of rotation and direction of rotation; a database in which said components are stored with said characteristics; an operating unit for selecting from said database said components provided for a specific configuration; a control unit for detecting installed components and determining differences between specified components and actual components; and means for displaying the specified components and the actual components that differ from one another on a display unit.

* * * * *